April 28, 1942.  W. A. FLUMERFELT  2,281,097
JOINT CONSTRUCTION
Filed Oct. 3, 1940
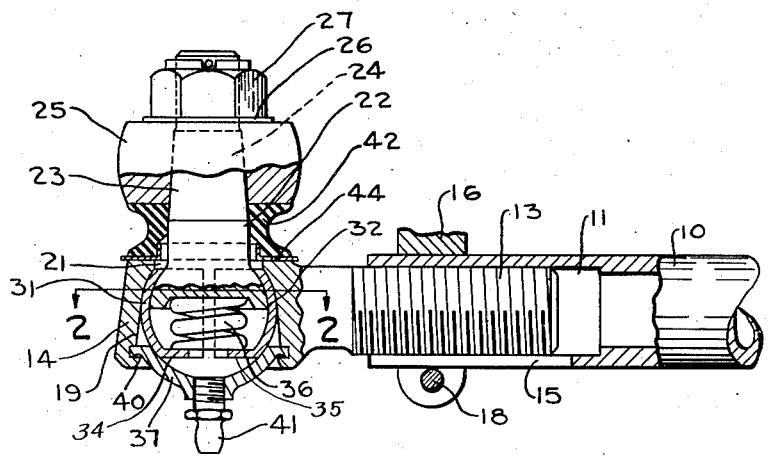
FIG-1
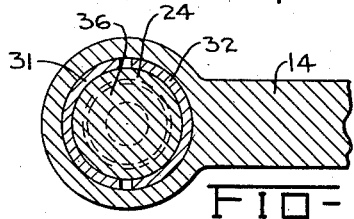
FIG-2
FIG-3 FIG-4
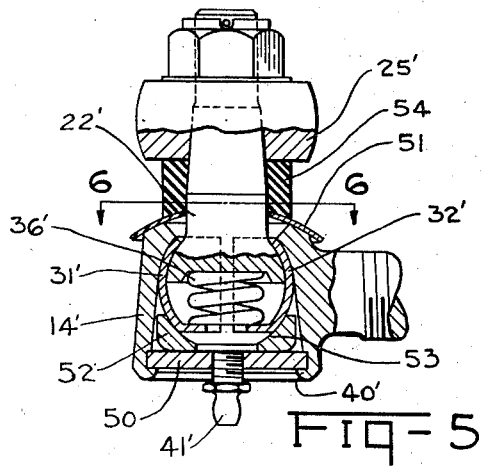
FIG-5
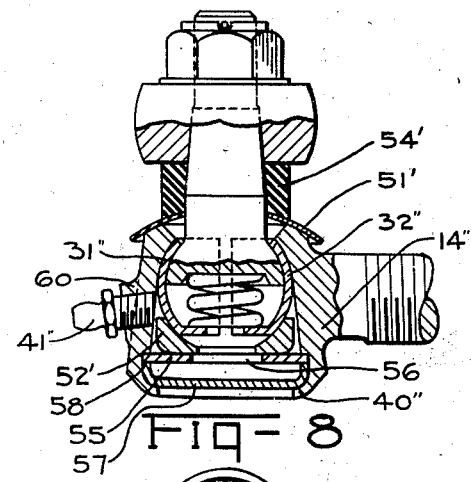
FIG-8
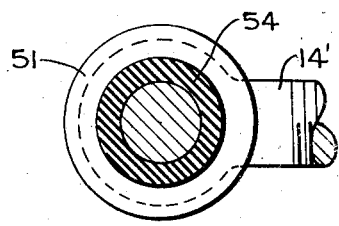
FIG-6
FIG-7
INVENTOR
William A. Flumerfelt
BY
Braselton, Whitcomb & Davies Patented Apr. 28, 1942

2,281,097

UNITED STATES PATENT OFFICE 2,281,097

JOINT CONSTRUCTION

William A. Flumerfelt, Columbus, Ohio, assignor to The Columbus Auto Parts Company, Columbus, Ohio, a corporation of Ohio Application October 3, 1940, Serial No. 359,580

4 Claims. (Cl. 287—90)

This invention relates to articulated joint constructions and more especially to those of a character known as ball joints adaptable for use in tie rod and drag link installations for automotive vehicles.

The invention has for an object the provision of a joint construction wherein the ball portion of the joint is made up of two similar elements having direct bearing engagement with the walls of the housing and a unitary bearing seat member.

The invention comprehends an articulated joint in which the spherical configuration is formed of a plurality of cup-like members having bearing contact with a housing and resting in a unitary bearing seat in combination with resilient means for automatically retaining the elements in their operative positions and at the same time automatically compensating for any wear of the bearing surfaces.

Another object of the invention resides in a joint construction of this character embodying a minimum number of elements and one which may be easily and quickly assembled and readily lubricated.

A further object of the invention resides in the provision of a joint structure incorporating a ball-like configuration formed of separable elements resting in a unitary bearing seat, the elements of the ball configuration being normally urged by spring means into contact with the walls of the housing and the seat member, thus eliminating multiple separable bearing seats for the ball configuration as in prior constructions.

Still another object resides in a novel closure means for the joint housing which permits both oscillatory and rotary movements of the stud member without impairing the effectiveness of the closure.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a vertical sectional view showing one form of the ball and socket construction of my invention;

Figure 2 is a horizontal sectional view taken substantially on the line 2—2 of Figure 1;

Figure 3 is a detail view illustrating one of the elements forming the ball configuration of the joint construction;

Figure 4 is a horizontal sectional view taken substantially on the line 4—4 of Figure 3;

Figure 5 is a view similar to Figure 1 showing a modified form of my invention;

Figure 6 is a horizontal sectional view taken substantially on the line 6—6 of Figure 5;

Figure 7 is a top plan view illustrating a bearing seat forming a part of the invention;

Figure 8 is a view similar to Figure 5 showing a further form of my invention.

The embodiment of the joint construction of my invention illustrated in the drawing is especially adaptable for tie rod connections but it is to be understood that I contemplate the use of my invention wherever the same may be found to be applicable.

Referring to the drawing in detail and particularly Figures 1 to 5 there is illustrated a form of joint construction adapted for tie rod connection to the dirigible or steerable wheels of a vehicle in which 10 designates a tubular tie rod which is interiorly threaded at its end as shown at 11 and arranged to receive a threaded tenon 13 formed as an integral portion of the joint housing 14. The wall of the tube 10 adjacent the tenon 13 is longitudinally slotted as at 15, the tube being surrounded by a clamp or collar 16 which is arranged to be drawn into clamping engagement with the tube 10 by means of a bolt 18 and nut (not shown). By this arrangement the tie rod tube and joint housing may be adjusted and locked in adjusted position by means of the clamp 16.

The joint housing 14 is formed of hollow configuration, the lower portion of the interior wall converging in a frusto-conical shape as at 19 which blends into a partial spherical curvature 20, the latter terminating in a restricted throat or opening 21 formed at the upper portion of the housing. Extending into the housing is a stud member 22 formed with a tapered shank portion 23 and a threaded tenon 24. The tapered portion 23 is adapted to extend into a tapered opening in an arm 25 which is connected to or made an integral part of a dirigible vehicle wheel supporting spindle (not shown), the stud member 23 being held in the arm by means of the washer 26 and a nut 27, the latter being threaded on the tenon 24 formed on the stud member. The lower extremity of the stud 23 is formed with a segmental spherically shaped portion 30 which projects into the interior of the housing 14.

Arranged within the joint housing and substantially surrounding the segmental spherical portion 30 of the stud member 22 is a pair of complementary cup-shaped members 31 and 32 preferably formed of sheet metal and which are spherically shaped interior and exterior surfaces. The exterior surfaces form together a substantially ball-shaped configuration providing the ball element of the joint construction. The interior surfaces of the cup-like members are arranged to engage and fit the spherically shaped portion 30 of the stud member and properly space and position the members 31 and 32 to form the ball configuration. The stud member is provided at its lower end with an axial recess 33. The members 31 and 32 have their lowermost portions formed with flattened surfaces 34 and 35 arranged in substantially the same plane. Interposed between the wall of the recess 33 and the inner flattened surfaces 34 and 35 of the cup members is a resilient means in the form of an expansive coil spring 36. Positioned beneath members 31 and 32 is a unitary ball seat member 37 which has an arcuate interior surface 38 engaging portions of the spherically shaped exterior walls of the cup members 31 and 32, the seat member 37 having a peripheral flange 39 which is held in place by a portion 40 of the housing which is swaged over the edge of the flange 39 of member 37. As illustrated in Figure 1, the seat member 37 is provided with a lubricant fitting 41 for introducing lubricant into the joint structure.

The upper opening 21 in the housing 14 is provided with a closure means including a flexible member 42, there being interposed between member 42 and the upper surface of the housing a metal member or flanged plate 44 which in the embodiment illustrated is adapted to slide laterally relative to the housing during both tilting and rotative movements of the stud member 22. The member 42 may be made of flexible material, for example, rubber, synthetic rubber, or any other suitable material which resiliently holds the plate 44 in constant contact with the upper surface of the housing during rotary and oscillatory movements of the stud member 22.

In the use of the joint construction of my invention, the spring 36 at all times exerts pressure upon the stud member 22 and the cup-like members 31 and 32 which form the ball portion of the joint urging the latter into constant bearing engagement with the spherical curvature 20 in the interior of the housing 14 and also the spherical curvature formed on the interior of the lower closure or unitary seat member 37. Thus any wear occurring on the several bearing surfaces will be automatically taken up by the expansive pressure of coil spring 36. Moreover, it should be noted that the configuration of the closure member 37 and the hollow interior formed by ball shaped members 31 and 32 provide a lubricant reservoir whereby the several elements of the joint may be satisfactorily lubricated.

In Figures 5, 6 and 7, I have shown a modified form of my invention wherein the joint housing 14' is provided with a lower closure plate 50 which is illustrated as of uniplanar construction held in place by swaging the housing 14' as at 40', the plate 50 being provided with a lubricant fitting 41'. Interposed between the cup-like members 31' and 32' and plate 50 is an annulus or ring-shaped member 52 particularly illustrated in detail in Figure 7 which has an arcuately or spherically shaped inner surface 53 of the same general spherical curvature as the exterior surfaces of the members 31' and 32', the lower surface of the member 52 resting upon the upper surface of the closure plate 50. The member 52 may be made of any suitable bearing material, as for example, brass, Babbitt metal or other material adapted for long wearing engagement with the exterior surface of the cup-like members 31' and 32'. The members 31' and 32' will always be urged into bearing contact with the inner spherically shaped surface of the housing and the inner spherically shaped surface 53 of annulus 52 under the influence of the expansive spring 36'. It should be noted that the central passage in the annulus 52 permits the ingress of lubricant from fitting 41' into the chamber formed by the annulus per se and that formed by the hollow interiors of the cup-like members 31' and 32'. The upper end of housing 14' is closed by means of a convex or partial spherically shaped plate 51, and interposed between the plate 51 and the arm 25' a cylindrical bushing 54 of flexible expansive material, as for example, rubber, synthetic rubber or the like, arranged to urge plate 51 into sealing engagement with the upper portion of the housing during movements of the stud member 22'.

In Figure 8 there is illustrated a further modified form of the invention wherein an exceptionally large lubricant reservoir is provided. In this form of the invention, the cup-like members 31'' and 32'' rest in an annulus 52'' of similar configuration to that illustrated in Figures 5 and 7, and immediately beneath annulus 52'' is a supporting plate 55 which is formed with a central opening 56. Positioned beneath plate or support 55 is a cup-like member 57 having upwardly projecting flange portions 58 which contact with and support the plate 55. The cup-like member 57 is held in position by swaging of the housing as shown at 40''. The housing 14'' is provided with an embossed portion 60 in which is fitted a lubricant fitting 41'' for injecting lubricant into the interior of the joint construction. Thus, in this arrangement, there is provided an exceptionally large lubricant chamber formed by the hollow interior of the cup-like member 57, opening 56 and plate 55, the central opening in the bearing seat or annulus 52'' and the hollow interiors formed in members 31'' and 32''. The upper part of the joint structure is closed by means of an arcuately or convex shaped plate 51' and a flexible member or bushing 54' of rubber or other suitable material as in the form shown in Figure 5.

It is apparent that, within the scope of the invention, modifications and different arrangements may be made other than is herein disclosed, and the present disclosure is illustrative merely, the invention comprehending all variations thereof.

What I claim is:

1. A joint construction including a hollow housing; a stud member having an enlarged portion projecting into said housing; a pair of similarly shaped elements in engagement with the enlarged portion of said stud member, the exterior lateral surfaces of said elements forming together a substantially ball-shaped configuration; said housing having an interior wall of partial spherical curvature; the spherical exterior surfaces of said elements being in bearing engagement with the curved interior wall of said housing; a seat element positioned beneath and in engagement with the curved exterior surfaces of said similarly shaped elements; each of said elements having interior flattened surfaces; and resilient means positioned within and engaging the flattened surfaces of both said elements and contacting said stud member for urging said elements into bearing engagement with the wall of said housing and said seat member.

2. A joint construction including a hollow housing; a stud member having an enlarged portion projecting into said housing; a pair of similarly shaped elements substantially surrounding and in engagement with the enlarged portion of said stud member, the exterior lateral surfaces of said elements forming together a substantially ball-shaped configuration; said housing having a curved interior wall; the spherical surfaces of said elements arranged for bearing engagement with the curved interior surface of said housing; a seat member of annular configuration positioned beneath said similarly shaped elements and having a surface arranged for bearing engagement with the exterior surfaces of said elements; a closure for the lower end of said housing arranged to support said seat member; and a coil spring contained within the interior of said elements having one end engaging the stud member, the other end of said spring engaging both of said elements for urging the latter into bearing engagement with the wall of said housing and a surface of said seat member.

3. A joint construction including a hollow housing; a stud member having an enlarged portion projecting into said housing; a pair of similarly shaped elements substantially surrounding and in engagement with the enlarged portion of said stud member, the exterior lateral surfaces of said elements forming together a ball-shaped configuration; said housing having an interior wall of partial spherical curvature; the spherical surfaces of said elements arranged for bearing engagement with the curved interior surface of said housing; an annular seat member positioned beneath said similarly shaped elements and having a curved surface arranged for bearing engagement with the exterior surfaces of said elements; each of said elements having interior flattened surfaces; a plate positioned at the lower end of said housing arranged to support said unitary seat member; and a coil spring contained within the interior of said elements and engaging the flattened interior surfaces of both said elements for urging the latter into bearing engagement with the interior wall of said housing and the curved surface of said seat member.

4. A joint construction including a housing having a passage therethrough; a stud member having a partially spherically shaped portion projecting into the passage in said housing; said stud member having an axial recess in the portion thereof projecting into said passage; a pair of similarly shaped elements formed of sheet metal surrounding and in engagement with the spherically shaped portion of said stud member, said elements forming together a hollow ball-shaped configuration providing a lubricant receiving chamber; the upper interior wall portion of the passage in said housing being of partial spherical curvature; the exterior spherical surfaces of said elements arranged for bearing engagement with the curved wall surface of said passage; a unitary seat member of annular configuration positioned beneath said similarly shaped elements and having a curved surface arranged for bearing engagement with the exterior surfaces of said elements; a closure plate for the lower end of the passage in said housing arranged to support said annular seat member; a coil spring contained within the interior of said elements having one end engaging in the recess in the stud member, the other end of said spring engaging both of said elements for urging the latter into bearing engagement with the curved wall of said passage and the curved surface of said seat member; and means for introducing lubricant into the lubricant receiving chamber formed by said elements.

WILLIAM A. FLUMERFELT.